United States Patent [19]

Aoyagi et al.

[11] Patent Number: 4,805,050
[45] Date of Patent: Feb. 14, 1989

[54] DISK PLAYER INFORMATION SELECTING APPARATUS

[75] Inventors: Yoshio Aoyagi; Tsuneo Ishii; Shizuo Kakiuchi; Naoto Arifuku, all of Saitama, Japan

[73] Assignee: Pioneer Electronic Corporation, Tokyo, Japan

[21] Appl. No.: 65,172

[22] Filed: Jun. 18, 1987

Related U.S. Application Data

[63] Continuation of Ser. No. 665,213, Oct. 26, 1984, abandoned.

[30] Foreign Application Priority Data

Oct. 27, 1983 [JP] Japan .................. 58-201994

[51] Int. Cl.⁴ .............................. G11B 27/19
[52] U.S. Cl. .................... 360/72.2; 369/32; 369/33
[58] Field of Search .......... 360/72.2, 75, 78; 369/32, 30, 33, 41, 111; 365/234, 215

[56] References Cited

U.S. PATENT DOCUMENTS

| 4,000,510 | 12/1976 | Cheney | 360/72.2 |
| 4,106,058 | 8/1978 | Romeas | 369/32 |
| 4,138,663 | 2/1979 | Lehareau | 365/234 |
| 4,375,091 | 2/1983 | Dakin | 360/72.2 |
| 4,428,074 | 1/1984 | Abe | 369/32 |
| 4,555,736 | 11/1985 | Mathieu | 369/32 |
| 4,608,676 | 8/1986 | Yoshida | 369/32 |

Primary Examiner—Alan Faber
Attorney, Agent, or Firm—Sughrue, Mion, Zinn, Macpeak & Seas

[57] ABSTRACT

A system for positioning a pick-up head of a disk player at a predetermined point having an address determining circuit to determine the position of the pick-up head. A calculating circuit determines the distance to a target position on the basis of the address detected. A controller provides a move output signal to displace the pick-up head at high speed to the target position. The address (location) of the head is again determined and a second move operation performed to plan the pick-up within a predetermined range so that a search for the target address can be performed.

8 Claims, 4 Drawing Sheets

DISK PLAYER INFORMATION SELECTING APPARATUS

This is a continuation of application Ser. No. 665,213, filed Oct. 26, 1984, now abandoned.

BACKGROUND OF THE INVENTION

This invention relates to an apparatus for performing music or a band selecting operation at high speed using a disk player.

Recently, a so called compact disc (CD) disk like recording medium has appeared commercially. On this disk program information, including address data, is helically recorded. Such a compact disk has the capability of storing recording music of about one hour duration on each side thereof. The music on each side may include about ten bands of music in the case of music of normal length; therefore, a for playing a compact disk must be able to select a desired band automatically and rapidly.

Accordingly, there has been proposed a band selecting apparatus as illustrated in FIG. 1. In reproducing music stored on a compact disk of this type, the distance to a desired band is obtained by address information with respect to the desired band and the address position with respect to a present or actual pick-up position. The pick-up is displaced in accordance with the thus obtained distance. In FIG. 1, the apparatus comprises a compact disk 1, a pick-up 2 for optically reading program information recorded on the compact disk 1, and, for converting the optically read out information, into an electric signal. An address data detecting section 3 detects address data from the electric signal obtained by the pick-out to thereby detect the present or actual position of the pick-up. A distance calculating section 4 calculates the number of tracks from the actual position of the pick-up obtained by the address data detecting section 3 to the address of a desired tune indicated together with a search instruction to thereby obtain the distance to the target. A counter 5 counts pulses produced by crossing tracks by the pick-up 2 when the pick-up 2 moves. A controller 6 controls the movement of the pick-up 2 to thereby perform the band selection. A pick-up displacement mechanism 7 displaces the pick-up in the radial direction of the compact disk, and an address judgment section 8 compares the actual address with the target address.

The technique of distance calculation performed by the distance calculation section 4 will now be described. The address information in the compact disk is expressed using the time from the starting point of the program information. One second is subdivided into 75 frames. The program information is recorded on the compact disk helically from a position on a 25 mm radius inner circumference of the disk to a position on a 58 mm radius outer circumference of the same disk with a constant linear velocity and with track pitch of 1.6 μm.

The number of the frame F on a radius of r is expressed by the following equation (1):

$$F = (2\pi r \times 75)/V \tag{1}$$

where V represents the linear velocity of the disk.

If the pitch of track is represented by P, the following relation is satisfied:

$$r = P \times n \tag{2}$$

where n represents the number of tracks. Accordingly, $$F = (2\pi \cdot 75 \cdot P \cdot n)/V \tag{3}$$

Accordingly, the total frame number ($F_{total}$) from $n_1$ to $n_2$ is $$\begin{aligned} F_{total} &= (n_2 2\pi \cdot 75 \cdot P \cdot n)/V dn \\ &= n_1 2\pi \cdot 75 \cdot P \cdot n(n_2^2 - n_1^2)/V \end{aligned} \tag{4}$$

Substituting the number $T (= n_2 - n_1)$ of the tracks from $n_1$ to $n_2$ into the equation (3), $$\begin{aligned} F_{total} &= 75\pi \cdot PT(T2n_1)/V \\ &= 75\pi \cdot T(TP + 2r_1)/V \end{aligned} \tag{5}$$

From the equation (5), $$T = \left( \sqrt{\frac{FVP}{75\pi} + r_1^2} - r_1 \right)/P \tag{6}$$

Since the address information recorded on the disc from the position at a radius of 25 mm, the number of tracks from the position at a radius of 25 mm to the address can be obtained from the address information F by substituting the value $r_1 = 25$ into the equation (6). If the actual address and the target address are represented by $F_c$ and $F_a$ respectively, the distance $\Delta T$ from the address $F_c$ to the address $F_a$ is as follows:

$$\Delta T = \left( \sqrt{\frac{F_a VP}{75\pi} + 625} - \sqrt{\frac{F_c VP}{75\pi} + 625} \right)/P \tag{7}$$

The address will now be described. Upon reception of a band selecting instruction together with a target address, the controller 6 transfers the target address to the distance calculating section 4 to cause the distance calculating section to calculate the distance to the target address from the present or actual address of the pick-up 2 obtained by the address data detecting section 3. The controller 6 presets the result of the distance calculation in the crossing pulse counter 5 and at the same time produces a pick-up feed instruction to the pick-up displacement mechanism 7.

If the pick-up 2 is moved by the pick-up displacement mechanism 7, track crossing pulses are generated and counted downwardly by the counter 5. When overflow occurs in the counter 5, an output is applied from the counter 5 to the controller 6 which in turns produces a stop instruction to the pick-up displacement mechanism 7. The remaining distance to the target which could not have been attained by the above-mentioned pick-up feeding operation is handled as follows: the controller 6 determines the direction of further movement of the pick-up 2 on the basis of comparison between the present address and the target address effected by the address judgment 8; then, the controller 6 presets "200" in the counter 5 to cause the pick-up 2 to be moved by 200 tracks which correspond to one of several divisional parts of an average distance for one tune and produces a pick-up displacing instruction to the pick-up displacement mechanism 7. The pick-up feeding operation as described above is repeated until the output of the address judgment section 8 reverses, that is, until the address judgment section 8 judges that the target address has been passed by the moving pick-up 2. Then, a further series of feeding operations are performed with a feeding pitch equal to one tenth of the previous one (that is, 20 tracks) for causing the pick-up to further approach the target address to thereby displace the pick-up 2 within a range of ±20 tracks.

FIG. 5 illustrated a flow chart of the technique of distance calculation performed by the distance calculation section 4. In the first step, the current address corresponding to the position of the pickup 2 is compared with the target address. If the current address is greater than the target address the pickup is moved in the reverse direction. If the current address is less than the target address then the pickup is moved in the forward direction. The number of tracks $\Delta T$ in which the pickup is moved is determined in accordance to the formula, $$\Delta T = \left( \sqrt{\frac{FaVP}{75\pi} + 625} - \sqrt{\frac{FeVP}{75\pi} + 625} \right)/P$$

The next step corresponds to the feeding operation in which the pickup is moved in accordance with the calculated distance. The counter is then preset with the number "200" corresponding to two hundred tracks. The pickup is then moved accordingly, and, a decision is made as to whether or not the distance moved is smaller than twenty tracks. If the distance moved is smaller than twenty tracks, the program ends. If the distance moved is greater than twenty tracks, the current address is then again compared to the target address. If the current address is greater than the target address, a decision must be made whether or not the displacement mechanism is currently feeding in the forward direction.

If the displacement mechanism is feeding in the forward direction then the direction is reversed and the counter is set to a value of twenty tracks. The feeding operation then continues and the pickup is moved 20 tracks. If the current address is greater than the target address, and the displacement mechanism is not feeding in the forward direction, then the feeding operation continues with the current value of the preset counter controlling the number of tracks moved. If the current address is less than the target address a decision must be made as to whether or not the displacement mechanism is feeding in the reverse direction. If the feeding mechanism is feeding in the reverse direction, then, the direction is reversed and the counter is set to twenty. The feeding operation then continues as the displacement mechanism moves the pickup in accordance with the value set in the counter.

A decision is again made whether or not the distance between the current address and the target address is smaller than twenty tracks. If it is, then, the controller 6 produces a stop instruction to the pick-up displacement mechanism 7. If the distance $\Delta T$ is greater than twenty tracks, the foregoing procedure is repeated until the difference between the current address and the target address is less than twenty tracks.

Since the conventional band selector apparatus performs the operation in such a manner as described above, even if the necessary distance to the target address was calculated and the pick-up was rapidly displaced, it requires the repeated displacement of the pick-up by a certain quantity. Hence, this system can not execute a rapid band selecting operation. Further, since the moving and stopping operations are frequently repeated, there is a risk of deterioration in reliability in the pick-up and the pick-up displacing mechanism.

Thus, although the quantity of movement causes a problem in a search operation, the reason why it was necessary to perform such a large number of moves after the track searching operation had been performed while counting the number of tracks, was that it was impossible to accurately calculate the number of tracks to the target address. From equation (7), it can be determined that the number of tracks to a target depends on the linear velocity of a disk and the pitch of tracks. A disk standard defines the linear velocity to be 1.2 to 1.4 m/sec, and the track pitch to be 1.6 $\mu$m±0.1 $\mu$m. However, the conventional tune selector apparatus does not have the ability for measuring the values of such a linear velocity and a track pitch. The calculation is performed by using values of a particular linear velocity and a particular track pitch suitably set within a standard range. Thus, it was impossible to avoid errors in pick-up displacing operations performed by using the result of such a calculation.

SUMMARY OF THE INVENTION

An object of the present invention is to eliminate the above-mentioned drawbacks of the conventional tune selector apparatus.

Another object of the present invention is to provide a band selector apparatus in which a high speed band selecting operation can be performed with a simple arrangement by repeatedly performing a pick-up displacing operation such that a number of tracks from the present position of a pick-up to a target is calculated and the pick-up is displaced while counting the calculated number of tracks.

Other objects, features and advantages of the present invention will be apparent when the following description is read in conjunction with the accompanying drawings.

PREFERRED EMBODIMENTS OF THE INVENTION

Figure 1:
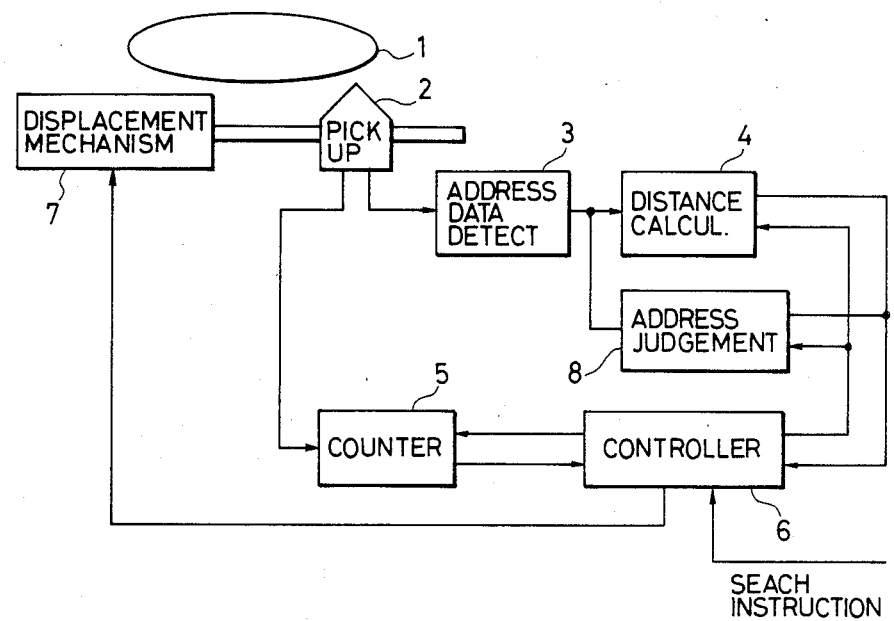
FIG. 1 is a block diagram illustrating the conventional information selecting apparatus for a disk player.

Referring to the drawings, preferred embodiments of the present invention will now be described.

Figure 2:
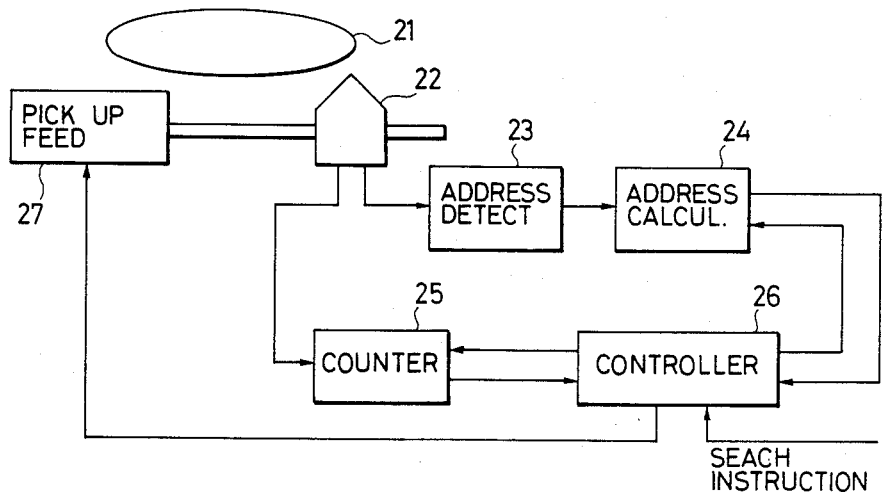
FIG. 2 is a block diagram illustrating an embodiment of the information selecting apparatus according to the present invention.

FIG. 2 illustrates a compact disk 21 and an optical pick-up 22 for reading information out of the compact disk 21. An address detecting section 23 detects address information from a signal obtained by the pick-up 22, used to determine the present or actual position of the pick-up. An address calculating section 24 is employed for obtaining the number of tracks from the present address produced by the address calculating section 24 to the target address. It may typically comprise a microprocessor of the type known in the art such as Hitachi H D 6301V. A counter 25 counts the number of tracks crossed by the pickup produced by the pick-up when the pick-up moves. A controller 26 is used for producing a pick-up feeding instruction to displace the pick-up to the neighborhood of the target address. This pick-up feeding instruction is based on the respective outputs of the abovementioned sections to a pick-up feeding section 27. The controller 26 also produces a stop instruction. The controller is a microprocessor of the type known in the art. Such a microprocessor can be of the same type as mentioned above as used for the address calculating section 24.

The operation of this embodiment of the present invention will now be described. Upon reception of a band selection, an instruction together with a target address similar to the conventional device, the controller 26 transfers the target address to the address calculating section 24 to cause the address calculation section 24 to calculate the distance, that is the number of tracks from the present position of the pickup to the target address. The controller 26 presets the result of the calculation into the counter 25 and at the same time produces a pick-up feed instruction to the pick-up feeding mechanism 27. Then the pick-up 21 moves radially on the disk while producing track crossing pulses which are successively applied to the counter 25 which downward counts the pulses from the present value.

Upon reception of an overflow signal from the counter 25 which is downward counting the track crossing pulses, the controller 26 produces a stop instruction to the pick-up feeding section 27 to cause the pick-up feeding section 27 to stop its pick-up feeding operation. The operations in this step are the same as in the conventional device.

According to the present invention, however, the address calculating section 24 is then driven again to obtain the distance from the position at which the pick-up has been stopped to the target address. The pick-up is displaced again while counting the tracks on the basis of the number of tracks to the target address obtained by the address calculating section 24 and the number of tracks is calculated again after displacement of the pick-up. This series of operations is repeatedly performed until the number of tracks to the target address is below a predetermined value (which is determined, in this embodiment, to be 20 tracks in comparison with the conventional case) to perform a search for the target address. This search is done by conventional techniques not disclosed herein.

Figure 3:
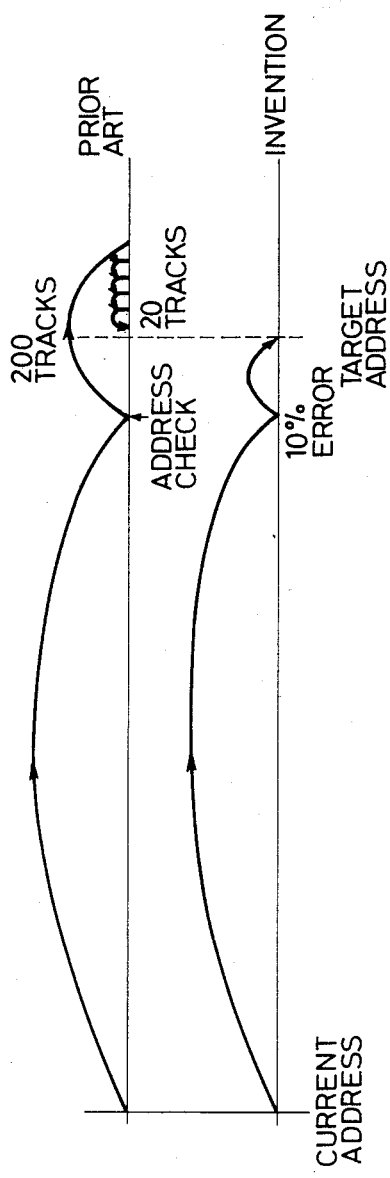
FIG. 3 is a diagram illustrating the movement in tune selecting operation according to the present invention and in the prior art.

The reason why this method of approaching the target address is employed is that, in view of the relation between the number of tracks to the target ΔT and the linear velocity V, if the absolute value of the number of tracks to the target becomes small, the difference between the number of tracks ΔT and the actual number of tracks is also small. This is because the linear velocity V is different from the actual linear velocity of the disk. Therefore, the closer the pick-up approaches the target address the more accurate the calculation of the number of tracks to the target can be performed, thus, permitting accurate displacement of the pick-up toward the target. FIG. 3 compares the performance of this invention vis-a-vis the prior art.

From the above description, it is seen that any value other than zero may be used in substitution for the value V in calculating the number of tracks. In a practial case, however, if a certain value within a range of disc standard V=1.2/sec−1.4 m/sec is employed, an error due to the difference between the setting of V in calculation and the value actual linear velocity value of the disk, reduces to about 10% for any disk, so that even in the case where about 20,000 tracks is searched from one end to the other of the disk, it is sufficient to perform the calculation about 4 times to approach the target.

Figure 6:
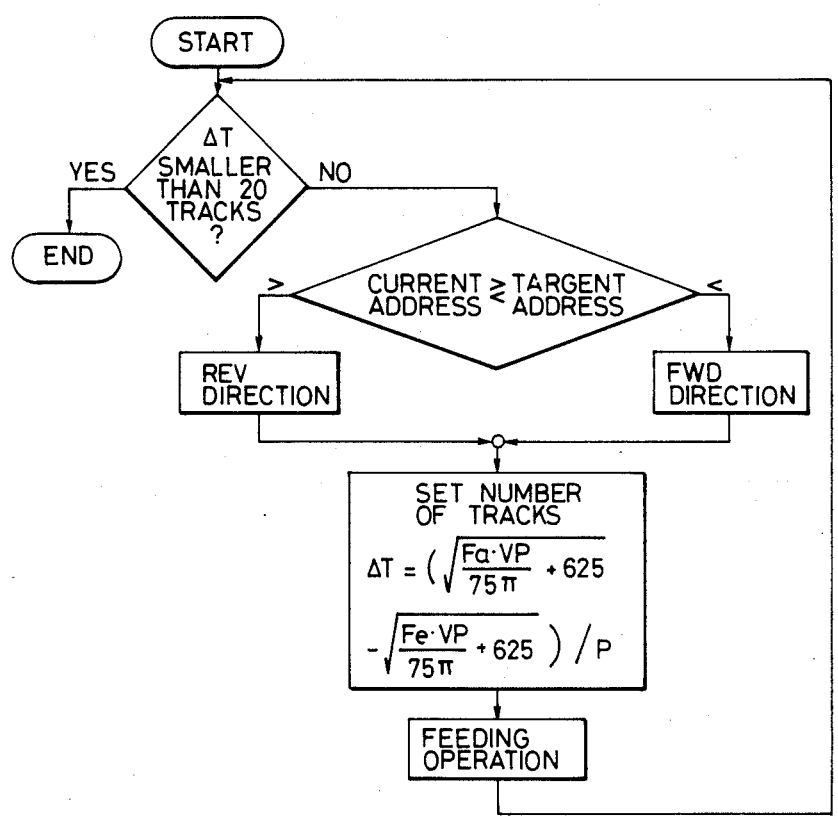
FIG. 6 is a detailed flow chart illustrating the technique of distance calculation performed according to the present invention.

FIG. 6 is a flow chart illustrating the technique of distance calculation performed according to the present invention. First, a decision is made whether or not the distance between the current address and the target address is smaller than twenty tracks. If this distance is smaller than twenty tracks, the search is completed, and a controller produces a stop instruction which is applied to the pick-up feed 27. If the difference between the current address and the target address is not smaller than twenty tracks then a decision must be made as to whether the current address is greater than the target address. If the current address is greater than the target address, the pick-up 22 must be displaced in the reverse direction, if the current address is less than the target address, then, the pick-up must be displaced in the forward direction. The number of tracks in which the pick-up is displaced is calculated in the address calculator 24 in accordance with the formula, $$\Delta T = \left( \sqrt{\frac{FaVP}{75\pi} + 625} - \sqrt{\frac{FeVP}{75\pi} + 625} \right)/P$$

After the value ΔT has been calculated, the pick-up is moved accordingly. The decision as to whether the difference between the current address and the target address is smaller than twenty tracks must again be made. If it is, then, the operation is completed; otherwise, the foregoing procedure is repeated.

Although the optical pick-up 22 is employed as a pick-up in the above preferred embodiment, any pick-up of either an electrostatic type or a magnetic type may be used as long as it can read address information and program information from a disk on which program information including address data have been recorded.

Figure 4:
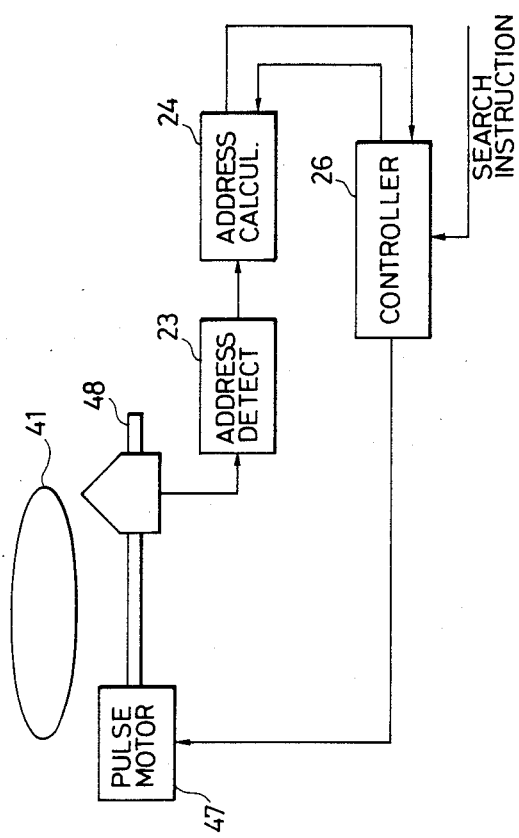
FIG. 4 is a block diagram illustrating another embodiment of the information selecting apparatus according to the present invention.
Figure 5:
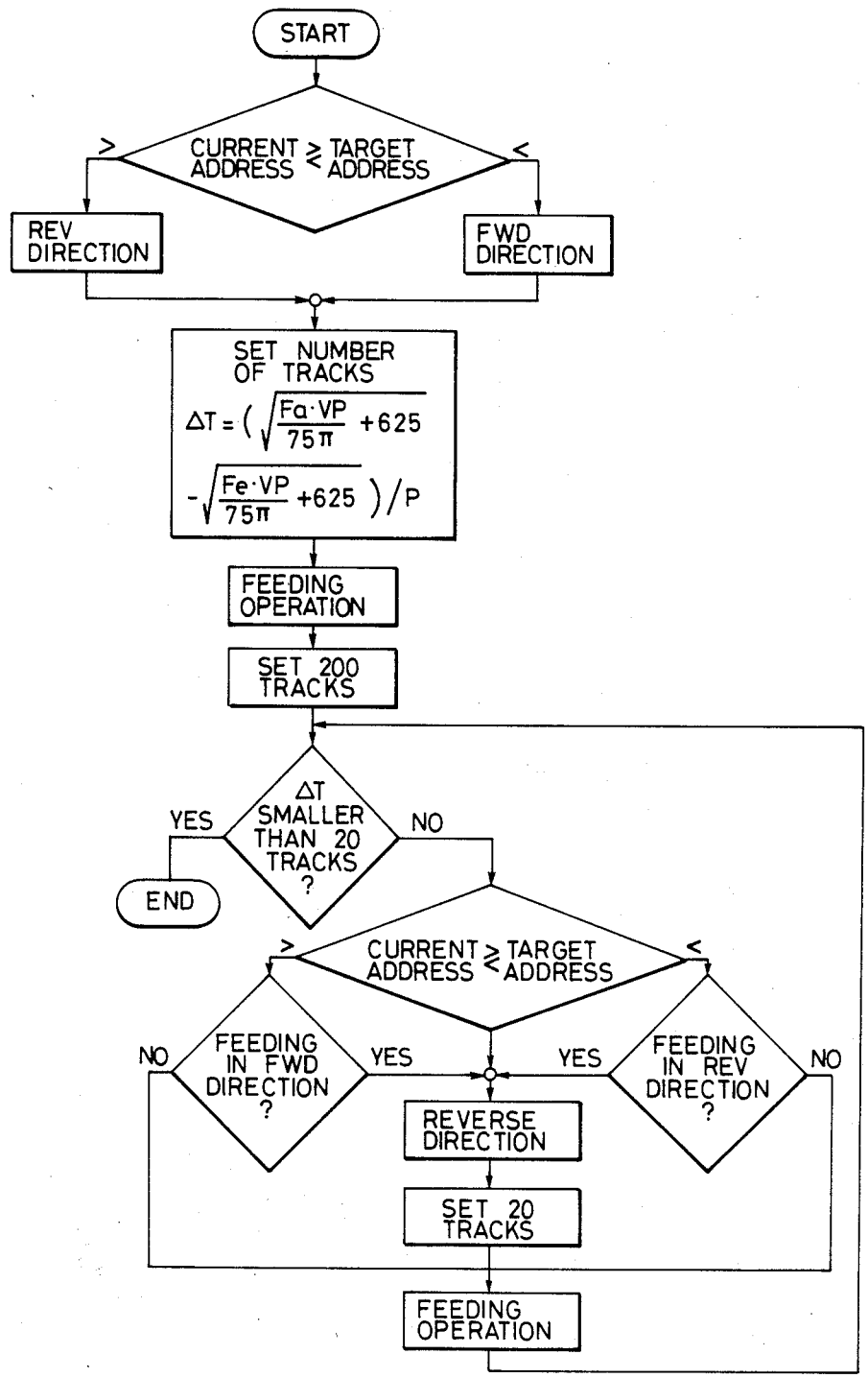
FIG. 5 is a detailed flow chart illustrating the technique of distance calculation performed by the prior art device.

Although the quantity of radial movement of the pick-up 22 is detected by counting the track crossing pulses as the pick-up moves radially, the same effect can be obtained by means of the modification as shown in FIG. 4. In this embodiment a pick-up feeding mechanism 27 comprises a pulse motor 47 and a feed screw 48. Pulses corresponding to the quantity of movement are produced from a controller 26, because the value of ΔT obtained by the equation (7) can be converted into a value of distance from the equation (2) Δr=P·ΔT.

Thus, according to the present invention, the apparatus is arranged to perform band selection operations by displacing a pick-up by repeatedly calculating the distance to a target until the distance to the target reaches a predetermined value by utilizing the fact that the more the pick-up approaches the target, the more accurate the value of the distance to the target can be obtained. Even if the linear velocity V defined by the disk standard is different from the setting value in the normal case, the target can be accurately approached in such a sequence that the pick-up is moved by a certain quantity and the address of the target being searched becomes unnecessary. Thus, the function of the controller is made simple and it becomes possible to perform a rapid band selecting operation. Further, since it becomes unnecessary to frequently perform pick-up feeding, it is possible to improve the reliability of the pickup feeding arrangement.

What we claim is:

1. An information retrieving apparatus for a disk player employing a disk-like recording medium on which program information including address data is recorded in tracks and information reading means is moved obliquely to said tracks to retrieve information starting from a desired position on said recording medium, comprising:

means for calculating, each time said information reading means is stopped after moving obliquely to said tracks, a distance to said desired position, according to the following:

$$\Delta T = (\sqrt{(F_a VP/75\pi) + 625} - \sqrt{(F_c VP/75\pi) + 625})/P$$

wherein $F_c$ is the actual address position, $F_a$ is the target address position, V represents the linear velocity of the disk, P represents the pitch of track, and T is the distance from said actual address position to said target address position; and means for displacing said reading head obliquely to said tracks through said distance toward said desired position after each said time and reading head is stopped until said reading head is within a predetermined distance from said desired position.

2. The information retrieving apparatus of claim 1, wherein said information reading means comprises an optical pick-up.

3. The information retrieving apparatus of claim 1, wherein said information reading means comprises an electrostatic pick-up for reading both program information and address data.

4. The information retrieving means for claim 1, wherein said calculating means comprises means for determining a displacement of said information reading means from a previous position to a present position.

5. The information retrieving means of claim 4, wherein said displacing means comprises a pulse motor and a feed screw for moving said information reading means in response to rotation of said pulse motor, and wherein said displacement determining means comprises means for sensing rotation of said feed screw.

6. The information retrieving means of claim 4, wherein said displacement determining means comprises means for counting a number of tracks traversed by said information reading means.

7. The information retrieving means of claim 1, wherein said calculating means comprises means for calculating said distance from address data read by said information reading means indicative of a present address and address data indicative of said desired position.

8. The information retrieving means of claim 1, wherein said information reading means comprises a magnetic pick-up for reading both program information and address data.

* * * * *